United States Patent Office 2,737,531
Patented Mar. 6, 1956

2,737,531

PRODUCTION OF CHLOROBENZENES

John W. Churchill, Kenmore, N. Y., assignor to Olin Mathieson Chemical Corporation, a corporation of Virginia No Drawing. Application January 24, 1951,
Serial No. 207,660

4 Claims. (Cl. 260—650)

My invention relates to the conversion of benzene hexachloride to chlorobenzenes having four to six chlorine atoms per molecule. More particularly, it relates to the use of chlorine for the direct conversion of benzene hexachloride into tetrachlorobenzenes, pentachlorobenzene and hexachlorobenzene.

In the conventional manufacture of benzene hexachloride, a product is obtained containing 12 to 15 per cent of gamma isomer. The remainder of the product is composed of large proportions of alpha and beta isomers with minor amounts of other isomers. Benzene hexachloride having such a composition is suitable for many insecticidal purposes. However, the only insecticidally effective isomer of benzene hexachloride is the gamma isomer. The other isomers of benzene hexachloride have relatively slight or no effect in comparison to the gamma isomer. For many purposes, therefore, the gamma isomer is separated from the other isomers of benzene hexachloride.

One of the most commonly practiced schemes for utilizing the rejected isomers is to convert them by dehydrochlorination to trichlorobenzenes which are useful as solvents and are suitable for chlorination to higher chlorinated benzenes. While trichlorobenzene has utility as a solvent, the large proportions of benzene hexachloride required for insecticidal use does not permit the utilization of all the trichlorobenzene which could be formed from the inactive isomers. For this reason, considerable trichlorobenzene from this source is converted by chlorination into higher chlorobenzenes. The higher chlorobenzenes are useful as solvents and as chemical intermediates.

The process of the present invention provides a means for obtaining the more desirable chlorobenzenes having more than three chlorine atoms per molecule directly from benzene hexachloride, any of its isomers or mixtures of isomers. My invention is particularly useful for treating the residual mixtures of benzene hexachloride isomers resulting from the separation of the gamma isomer in a relatively pure state.

According to my invention, I contact liquid phase benzene hexachloride with chlorine in the presence of a nuclear chlorination catalyst and at an elevated temperature. Under these conditions, copious amounts of hydrogen chloride gas are evolved, and depending on the proportion of chlorine used, the principal product may be tetrachlorobenzenes, pentachlorobenzene or hexachlorobenzene. In order to form primarily tetrachlorobenzenes, I use approximately one mole of chlorine or somewhat more for each mole of benzene hexachloride isomer charged to the reaction.

The chlorination catalyst may be any of those effecting nuclear halogenation of aromatic hydrocarbons. Such catalysts include iodine, antimony trichloride, aluminum chloride and ferric chloride. I particularly prefer the latter because of its cheapness and effectiveness. From about 0.1 per cent to 5 per cent of the chlorination catalyst based on the benzene hexachloride charged may be used. I have found that about 0.5 to 2 per cent of chlorination catalyst based on the benzene hexachloride charged is the optimum range.

The reaction may be started by melting the benzene hexachloride, adding the catalyst and beginning the introduction of chlorine. If, under these conditions, the reaction is to vigorous and difficult to control, the benzene hexachloride can be diluted with a suitable solvent. The use of a solvent has the advantage that it helps to avoid sublimation of benzene hexachloride and may thus help to avoid clogging the equipment. On the other hand as soon as the reaction starts, chlorobenzenes are formed which act as a solvent whether or not a solvent was added initially. The use of a solvent permits conversion at lower temperatures and when the purpose is to prepare 1,2,4,5-tetrachlorobenzene it is some advantage because the lower temperature of chlorination helps to avoid the formation of penta- and hexachlorobenzenes. Similarly, when the purpose is to prepare pentachlorobenzene, the use of a solvent helps to avoid the formation of hexachlorobenzene because it permits the use of low temperatures of chlorination. The solvent should be stable with respect to chlorine and the chlorination catalyst and easily separable from the desired products. The most appropriate solvents for this reaction include mixtures or individual isomers of the trichlorobenzenes or tetrachlorobenzenes which result from previous conversion operations. The proportion of solvent used is not critical and may vary from 5 per cent to 500 per cent by weight of the benzene hexachloride charged. Ordinarily, approximately an equal weight of the solvent is sufficient to accomplish the desired control of the conversion reaction.

In effecting the reaction, I prefer to operate at temperatures above about 100° C. in order to obtain reaction at a satisfactory rate. I find that temperatures over about 250° C. tend to increase loss of benzene hexachloride by sublimation and to lead to other decomposition reactions which are deleterious to the quality and quantity of the desired product. I, therefore, prefer to operate in the range of about 110° to 150° C. when a solvent is employed, and at temperatures below 250° C. when no solvent is present initially.

Example I 144.3 grams of benzene hexachloride was charged to a reaction flask together with 144.6 grams of 1,2,4-trichlorobenzene and 0.95 gram of ferric chloride. The solid was dissolved by heating the mixture to 110° C. when 0.95 gram of anhydrous ferric chloride was added and the introduction of chlorine was started. Chlorine was introduced at a rate of about 30 grams per hour. The temperature gradually rose to about 140° C. and remained at this temperature during 1.5 hours of chlorination.

Analysis of the liquid mixture showed that at this time it contained about 40.44 weight percent of benzene hexachloride isomers and 59.56 weight percent of polychlorobenzenes having an average chlorine content of 3.51 chlorine atoms per molecule.

Example II 507 grams of benzene hexachloride and 5 grams of anhydrous ferric chloride was charged to a reaction flask and heated to a temperature of 180°–230° C. for four hours while chlorine was introduced at the rate of about 80 grams per hour. Analysis of the liquid showed that it contained 33.8% of benzene hexachloride isomers and 66.2% of chlorobenzenes having an average chlorine content of 4.2 chlorine atoms per molecule. Infra-red analysis showed that the mixture contained about 15% of tetrachlorobenzenes, 18% of pentachlorobenzene and about 33% of hexachlorobenzene with the remainder unreacted benzene hexachloride. These are separated by distillation and crystallization, recycling the portions containing benzene hexachloride.

Example III

Ninety parts of benzene hexachloride having the following approximate analysis by infra-red:

| Component: | Percent |
|---|---|
| Alpha | 69 |
| Beta | 8 |
| Gamma | 12 |
| Delta | 8 | was melted in an iron pot at 125° C. and about 0.1 part of anhydrous ferric chloride was added as catalyst. Chlorine was introduced initially at the rate of 15 parts per hour and the temperature allowed to rise to 225° C. The rate of chlorine addition was reduced gradually to 9 parts per hour at the end of the run of about 8 hours. Hydrogen chloride was copiously evolved and at the end of the run a yield of about 98% of hexachlorobenzene of melting point 225°–227° C. was obtained.

Example IV

Chlorine gas was passed at a rate of about 1 lb. per hour into 12 lbs. of molten benzene hexachloride containing 0.1% by weight of iron powder as a catalyst. The melt was initially at a temperature of 180° C. and its temperature rose with chlorination from 180° to 236° C. at the end of the reaction. During a period of 9 hours about 9.2 lbs. of chlorine was added. The calculated amount of chlorine required to effect the desired conversion to hexachlorobenzene was 8.8 lbs. Substantially all of the benzene hexachloride was converted and the product containing about 95% of hexachlorobenzene was obtained by dropping the batch into water at 25° C. with agitation. The product is thus obtained in the form of fine particles of about 10 to 25 mesh.

I claim:

1. The process which comprises treating benzene hexachloride with chlorine in the presence of ferric chloride at an elevated temperature until a substantial proportion of hexachlorobenzene is produced, the benzene hexachloride being in a liquid phase which initially contains trichlorobenzene in an amount sufficient to reduce substantially sublimation of the benzene hexachloride.

2. The process which comprises treating benzene hexachloride with chlorine in the presence of a nuclear chlorination catalyst at an elevated temperature until a substantial proportion of a chlorobenzene containing from 4 to 6 nuclear substituted chlorine atoms per molecule is produced, the benzene hexachloride being in a liquid phase which initially contains a material selected from the group consisting of trichlorobenzenes and tetrachlorobenzenes in an amount sufficient to reduce substantially sublimation of the benzene hexachloride.

3. A method according to claim 2 in which said catalyst is ferric chloride.

4. A method according to claim 2 in which said catalyst is ferric chloride and in which said temperature is within the range of from 110° to 150° C.

References Cited in the file of this patent

Van der Linden: "Rec. des Trav. Chim. des Pays-Bas," vol. 57, pgs. 217–224 (1938).